Figure 1:
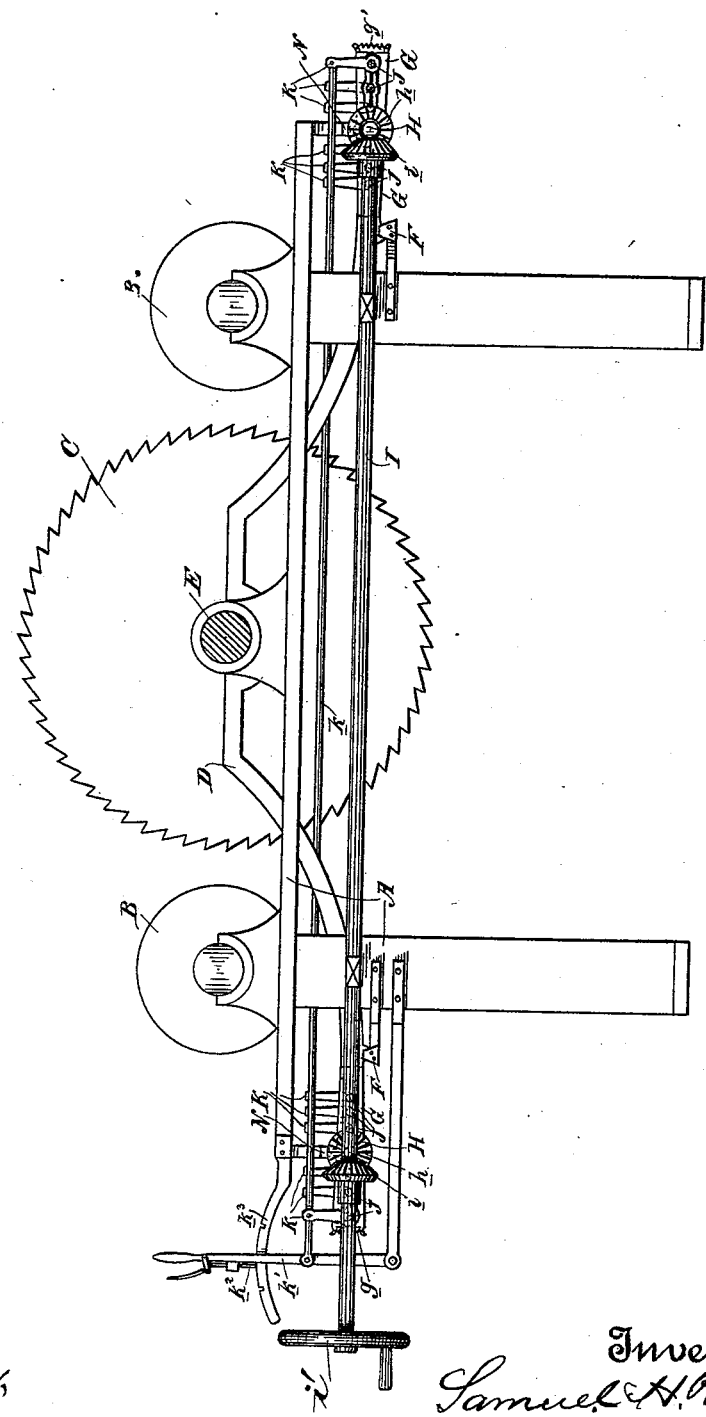

(No Model.)  2 Sheets—Sheet 1.

S. H. PRATT.
SHIFTER FOR GANG EDGERS.

No. 421,609. Patented Feb. 18, 1890.

Witnesses,

Inventor,
Samuel H. Pratt
By Dewey &
Atty (No Model.) 2 Sheets—Sheet 2.
S. H. PRATT.
SHIFTER FOR GANG EDGERS.
No. 421,609. Patented Feb. 18, 1890.
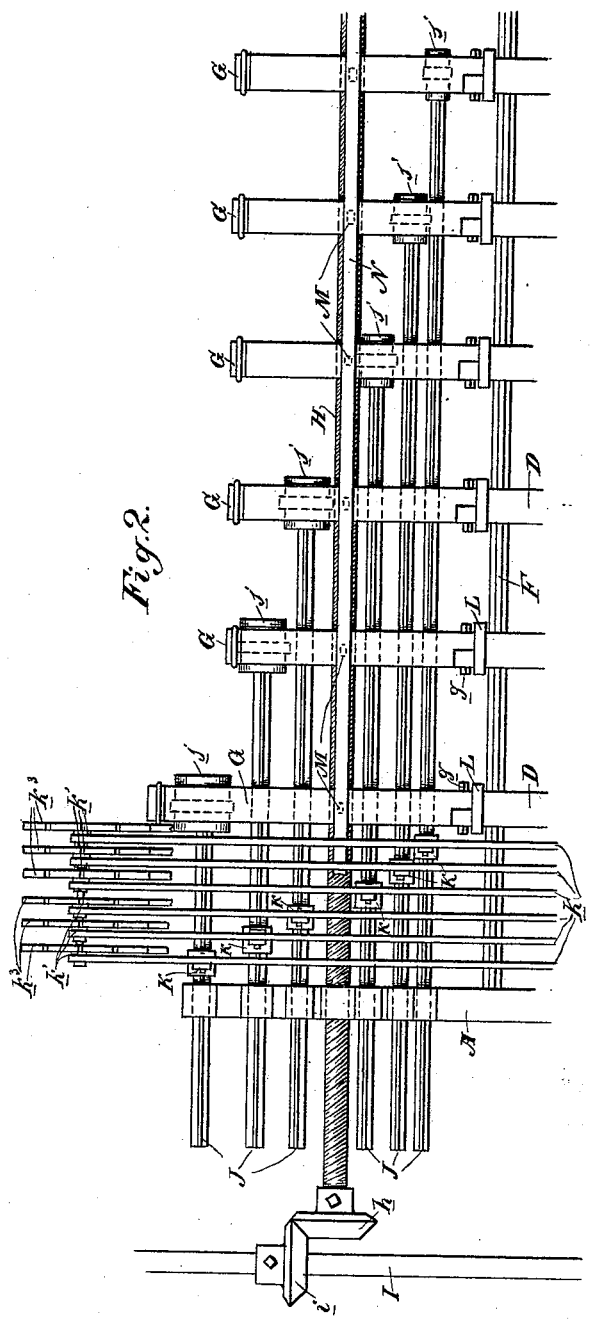
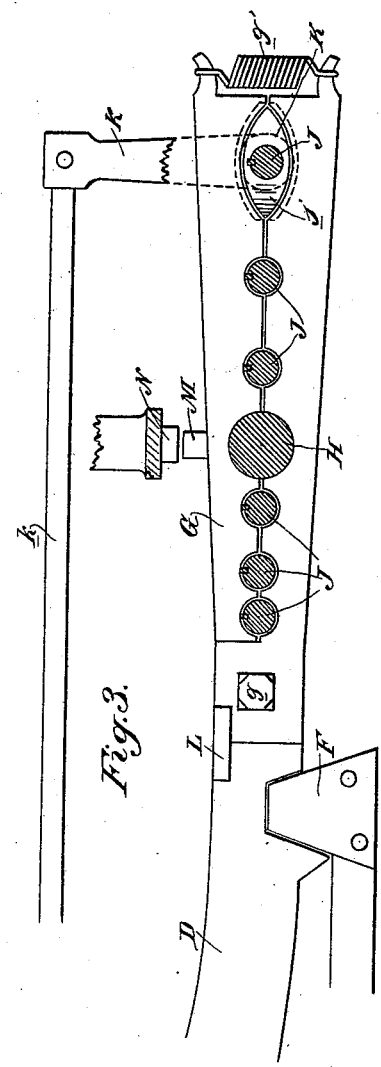
Witnesses,
J. H. Nourse
H. C. Lee.
Inventor
Samuel H. Pratt,
By Dewey & Co.
Attys

UNITED STATES PATENT OFFICE.

SAMUEL H. PRATT, OF BROWNSVILLE, CALIFORNIA.

SHIFTER FOR GANG-EDGERS.

SPECIFICATION forming part of Letters Patent No. 421,609, dated February 18, 1890.

Application filed November 4, 1889. Serial No. 329,232. (No model.)

*To all whom it may concern:*

Be it known that I, SAMUEL H. PRATT, of Brownsville, Yuba county, State of California, have invented an Improvement in Shifters for Gang-Edgers; and I hereby declare the following to be a full, clear, and exact description of the same.

My invention relates to the general class of gang-edgers, and especially to the saw-shifting devices therefor; and my invention consists in the novel arrangement and combination of parts hereinafter fully described, and specifically pointed out in the claims.

The essential object of my invention is to provide simple and effective means for shifting any one or more of the saws at the same time and independently of each other.

Referring to the accompanying drawings for a more complete explanation of my invention, Figure 1 is an end elevation of my edger. Fig. 2 is a plan of one side of the same, showing the arrangement of nuts and shifting-connections. Fig. 3 is a side elevation of one nut and its connections.

A is the frame of the edger, of which B are the pressure-rolls and C the saws, D the yokes that carry the saws, E the arbor and collar, and F the side braces or tracks extending lengthwise of the machine and forming slides for the yokes in the usual manner. Attached to each end of each yoke is a divided or two-part nut G. The parts of this nut are pivoted by a bolt $g$ to the end of the yoke, and the said parts are held together by means of a spring $g'$, connecting their outer ends. Through these nuts pass the lead-screws H—one on each side—said screws being operated by means of beveled gears $h$ on one end thereof, which mesh with beveled gears $i$ on the cross-shaft I at the head of the machine. Between the two parts of each nut is made an oval or eccentric shaped socket, and into these sockets are fitted the cam portions $j$ of a series of shafts J, said shafts being independent of each other. The cam portion $j$ is on the end of each shaft, and each shaft operates one nut, but passing freely through such of the other nuts as lie in their path, the arrangement being as shown in Fig. 2. These shafts are flanged into the nuts, so that they move with them, and each shaft is mounted in boxes, enabling it to slide back and forth longitudinally. The shafts have feather-keys extending their whole length, and upon them are fitted the arms K, one on each side, and connected in pairs by cross-bars $k$, operated by hand-levers $k'$, provided with a pawl $k^2$, adapted to engage a rack $k^3$. By moving one of these hand-levers the corresponding pair of cam-shafts will be rocked, so as to open or expand the pair of two-part nuts which they engage, thereby relieving said nuts of the lead-screws and rendering them temporarily inoperative.

A flanged lug L is formed with or attached to the ends of each yoke and embraces the sides of the two-part nut, serving to steady it and hold it rigid when it is closed on the screw. The upper portion of each nut is provided with a tooth or lug M, which is adapted, when the nut is open, to be thrown into engagement with the teeth of the fixed rack N, extending the length of the machine and on each side and lying directly above the lead-screws.

The operation of the device is as follows: The springs $g'$ serve to hold all the nuts G to their engagement with the lead-screws H, and if it be desired to shift all the saws of the edger the hand-wheel $i'$ is operated, so that through the cross-shaft I and gearing $h$ $i$ the lead-screws are turned, whereby, engaging all the nuts, they cause said nuts to travel, and these in turn being connected with the yokes effect the shifting of all the saws; but if it be desired, for example, to shift only one of the saws, then all the hand-levers $k'$ but one are operated, whereby their cam-shafts J are rocked to open all the nuts except the one pair required to remain in engagement. All the nuts, therefore, but this one pair being relieved of the lead-screws the screws effect only that pair of nuts which will shift the given saw. In this manner, therefore, any one, two, three, or more of the saws may be shifted at the same time and independently of each other. When any nut is in an open position, its lug M, engaging the fixed rack N above, holds it steady and prevents the yoke from moving.

Having thus described my invention, what I claim as new, and desire to secure by Letters Patent, is—

1. In a saw-shifting device for gang-edgers, the two-part expanding and contracting nuts connected with each sliding yoke of the edger and engaging the lead-screws, substantially as described.

2. In a saw-shifting device for gang-edgers, the combination of the two-part expanding and contracting nuts carried by the yokes of the edger and engaging the lead-screws, and the separate cam-shafts engaging each nut for throwing them out of engagement with the lead-screws, substantially as described.

3. In a saw-shifting device for gang-edgers, the combination of the two-part expanding and contracting nuts carried by the yokes of the edger and engaging the lead-screws, the springs for holding the nuts to their engagement with the lead-screws, and the separate cam-shafts for the nuts, whereby they are opened to relieve them of their engagement with the lead-screws, substantially as described.

4. A saw-shifter for gang-edgers, consisting of the sliding yokes for moving the saws, the two-part expanding and contracting nuts connected with the yokes, the lead-screws which the nuts engage, the springs for holding the nuts to the screws, and the separate cam-shafts for expanding the nuts and relieving them of the screws, substantially as described.

5. A saw-shifter for gang-edgers, consisting of the two-part expanding and contracting nuts carried by the yokes of the edger, one on each end of the yoke, said nuts engaging the lead-screws on each side of the machine, the springs on each nut for holding them to their engagement with the lead-screws, the cam-shafts, one for each nut, and adapted to open it to relieve it of the lead-screws, the cranks of said cam-shafts, the cross-bars of the cranks connecting the cam-shafts in pairs, one on each side, and the hand-levers of said cross-bars for operating them, whereby the shafts are rocked, substantially as described.

6. In a saw-shifting device for gang-edgers, the two-part expanding and contracting nuts carried by the yokes of the edger and engaging the lead-screws thereof, the cam-shafts for opening said nuts, and springs for closing them, in combination with the lug or tooth on each nut, and the fixed rack with which the lug or tooth engages to hold the nut when in an open position, substantially as described.

7. In a saw-shifter for gang-edgers, and in combination with the two-part expanding and contracting nuts carried by the yokes and engaging the lead-screws, the flanged lugs on the ends of the yokes for steadying and holding rigid the nuts when engaging the screws, substantially as described.

8. In a gang-edger, the sliding yokes for shifting the saws, the tracks on which they move, and the lead-screws and gearing by which they are operated, in combination with the two-part expanding and contracting nuts connected with each end of each yoke and engaging the lead-screws, the springs for holding the nuts to their engagement, the separate cam-shafts for opening each nut, and the hand-levers and connections for operating the cam-shafts, substantially as described.

In witness whereof I have hereunto set my hand.

SAMUEL H. PRATT.

Witnesses:
R. W. EMERSON,
H. A. CONWELL.